United States Patent [19]
Nortier

[11] Patent Number: 5,548,119
[45] Date of Patent: Aug. 20, 1996

[54] TOILET ROOM SENSOR ASSEMBLY

[75] Inventor: Richard A. Nortier, Westchester, Ill.

[73] Assignee: Sloan Valve Company, Franklin Park, Ill.

[21] Appl. No.: 430,508

[22] Filed: Apr. 25, 1995

[51] Int. Cl.⁶ .................................. G01J 5/10; E03C 1/03
[52] U.S. Cl. .......................... 250/341.1; 250/221; 4/304; 4/623
[58] Field of Search .................................... 250/221, 239, 250/341.1, 341.8; 4/304, 623

[56] References Cited

U.S. PATENT DOCUMENTS 5,025,516  6/1991  Wilson ..................................... 250/221

*Primary Examiner*—Carolyn E. Fields
*Attorney, Agent, or Firm*—Dorn, McEachran, Jambor & Keating

[57] ABSTRACT

A sensor assembly for use in a toilet room for detecting the adjacent presence of the user of a toilet room device has a body with a hollow threaded mounting shank extending outwardly therefrom. The body has a platform and there is an upwardly extending wall on the platform which defines a chamber. An infrared transmitter and an adjacent infrared receiver are positioned within the chamber on a P.C. board. There is an electrical cable attached to the mounting board and which extends through the threaded shank. A shroud extends about the transmitter and receiver and has a pair of adjacent openings in alignment with the transmitter and receiver. The wall has an infrared transparent window in alignment with the transmitter and receiver openings in the shroud. A cap extends over the wall, chamber and window and is seated upon the platform. The cap has an opening in alignment with the window whereby infrared signals from and to the infrared transmitter and receiver may pass through the cap opening and transparent window for use in detecting the presence of a person adjacent the sensor assembly.

6 Claims, 1 Drawing Sheet

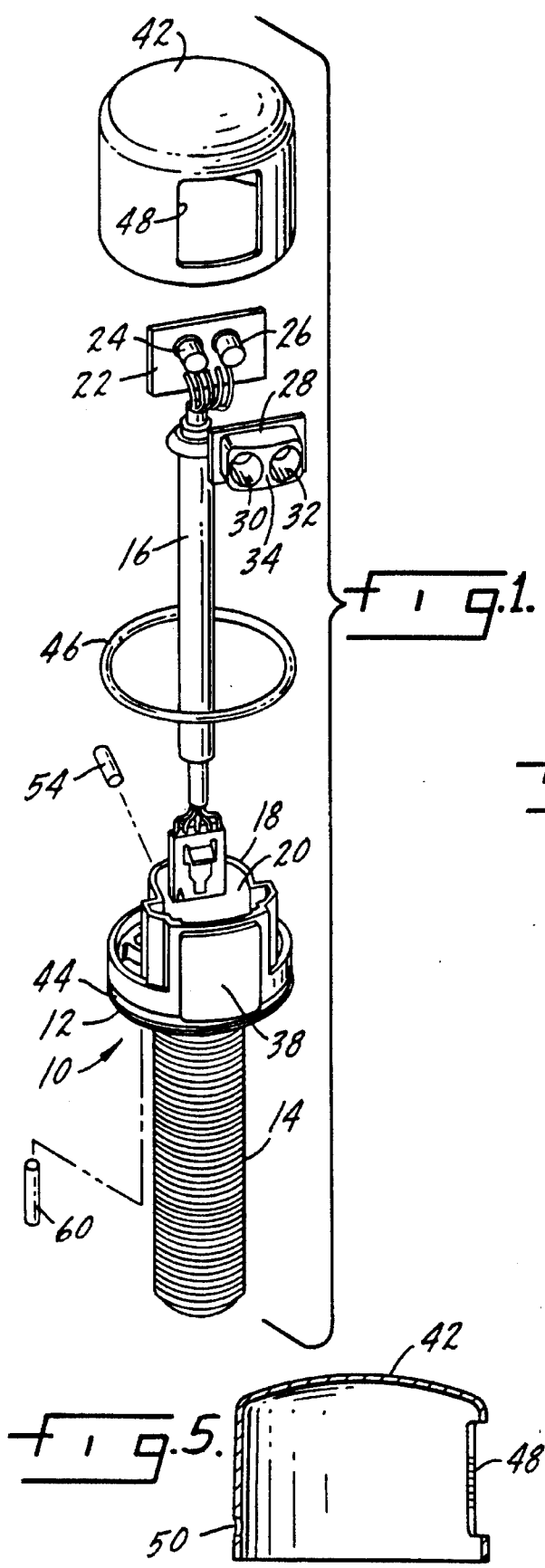
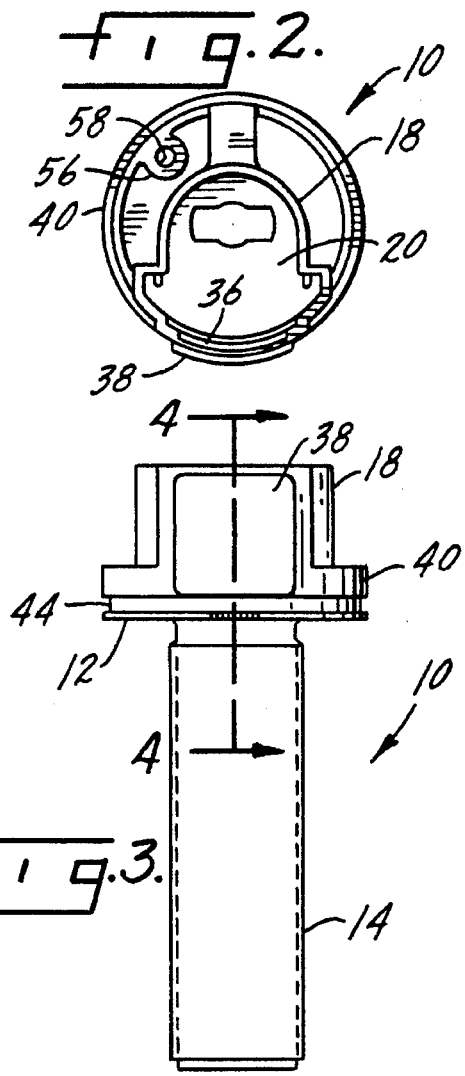
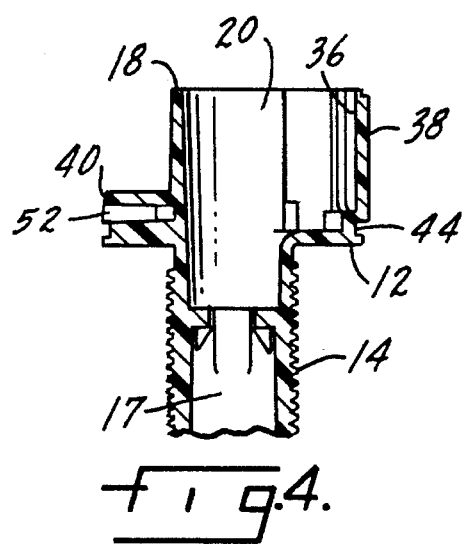

5,548,119

TOILET ROOM SENSOR ASSEMBLY

THE FIELD OF THE INVENTION

The present invention relates to infrared sensors which are found in public or commercial washrooms for detecting the presence of a person adjacent to a toilet room device which may be a urinal, a water closet, a soap dispenser, a hand dryer, a faucet, or any other device commonly found in that environment. The most common practice today is to have the sensor directly associated with the toilet room device. For example, such a sensor might be mounted directly above a urinal and associated with the flush valve for operating the urinal. The sensor may be located beneath a faucet spout so that when a user places hands beneath the faucet spout, the water will turn on. Similar sensors are used with hand dryers and soap dispensers. The problem with having a sensor directly built into the housing of such toilet room devices is that each sensor has a different exterior configuration with the result that there is a different type of sensor housing and associated mounting parts for each toilet room device. The present invention provides an independent stand-alone sensor which may be used with any type of toilet room device. It may be located adjacent a urinal or water closet, or adjacent a faucet, hand dryer or soap dispenser. In every such application, the sensor is the same. It uses the same parts, has the same housing, and will function in the same manner.

Sensors of the type described, which are separate and apart from the toilet room device, have been known in the art. The present invention provides specific improvements on such a sensor in terms of deterring vandalism, insuring that the device is reliable, may be simply adjusted as to range, and easily maintained.

SUMMARY OF THE INVENTION

The present invention relates to a sensor assembly for use in a toilet room environment and particularly to such a sensor assembly which is reliable, compact, easily adjusted and maintained.

A primary purpose of the invention is a sensor assembly as described, which has a reduced number of parts when compared with prior art sensors, and has an infrared transparent window which is integral with the sensor body.

Another purpose is a sensor as described in which a major portion of the electronic controls are relocated from the sensor body to a separate enclosure.

Another purpose is a sensor as described which is usable with all types of toilet room devices.

Another purpose is a sensor assembly having a specific construction to inhibit vandalism and misorientation of the sensor window and the sensor infrared transmitter and receiver.

Another purpose is a sensor assembly having improved means thereon for mounting the assembly adjacent a toilet room device.

Other purposes will appear in the ensuing specification, drawings and claims.

BRIEF DESCRIPTION OF THE DRAWINGS

The invention is illustrated diagrammatically in the following drawings wherein:

FIG. 1 is an exploded perspective view of the sensor assembly of the present invention;

FIG. 2 is a top view of the sensor body;

FIG. 3 is a side view of the sensor body;

FIG. 4 is a section along plane 4—4 of FIG. 3; and

FIG. 5 is an axial section through the sensor cap.

DESCRIPTION OF THE PREFERRED EMBODIMENT

It is common practice in commercial or public washrooms to utilize sensors, particularly infrared sensors, to insure the operation of toilet room devices such as urinal flush valves, flush valves for water closets, faucets, hand dryers, and soap dispensers. There are two types of such sensors currently on the market. The first and most widely used has the sensor designed for the particular type of toilet room device. That is, the association between the sensor and the flush valve or the sensor and the faucet is particularly suited for the product. A second type of sensor is one which is uniform for all types of toilet room devices and the present invention is particularly directed to this type of toilet room sensing device.

In the drawings the sensor assembly is shown to include a body indicated generally at 10 which has a platform 12 and a downwardly extending threaded shank 14. The shank 14 is hollow and will provide a passage 17 for an electrical cable 16 which will connect the infrared transmitter and receiver mounted on the platform 12 with the external electronic controls. The cable 16 may be an armored cable as shown or it may be an electrical cable without an outer shield. In prior art sensors, substantially the entire electronic control system was positioned within the sensor assembly. In the present invention a substantial portion of the electronic control circuit has been relocated to a separate enclosure which will be attached to the cable 16. This provides easier maintenance, as well as easier adjustments such as for sensor range, facilitating a more reliably operable sensor.

Extending upwardly from the platform 12 is an irregularly-shaped wall 18 forming a chamber 20 within which is positioned a printed circuit board 22 mounting an infrared transmitter 24 and an infrared receiver 26. Customarily, these devices and the printed circuit board will be encapsulated in a suitable potting compound so as to prevent damage to the electrical connections and to the transmitter receiver or emitter and detector as they are commonly referred to.

Positioned directly in front of the transmitter and receiver 24 and 26 is a shroud 28 which may conveniently be formed of a suitable plastic and will be mounted directly to the PC board 22. The shroud 28 has a pair of openings 30 and 32 which are in alignment with the described transmitter and receiver. It is important to note that the openings 30 and 32 are separated by a shroud portion 34 which has the effect of insuring separation between the transmitted infrared signal and the received signal, thus preventing direct feedback of reflected signals from the transmitter to the receiver. The shroud in effect shields or seals the receiver or detector from the transmitter or emitter.

The irregularly-shaped wall 18 has a recess 36 which is adjacent an infrared transparent window 38, which window is located directly in front of and in alignment with the openings 30 and 32 which provide passage for the transmitted and received infrared signals.

Outboard of the irregularly-shaped wall 18 is a peripheral support 40 which extends directly above the outside of platform 12 and provides the interior support for the sensor cap 42. The wall 40 positions and locates cap 42 which is seated upon the platform.

Directly beneath the support wall 40 there is a peripheral groove 44 within which is positioned a seal ring or O-ring 46 which has the function of centering the cap on the body and insuring a snug fit of the cap when it is properly located. The cap will fit over the O-ring 46 when it is properly assembled. In order to insure proper alignment of the cap 42, which has an opening 48 in alignment with the infrared transparent window 38, the cap has an alignment hole 50 and the support wall 40 has a similar hole 52. A pin 54 is inserted through the aligned holes when the cap is properly located on the body 10 insuring alignment between cap opening 48 and window 38 so that the infrared transmitter and receiver will have unobstructed access to the area in front of the sensor. The periphery of cap opening 48 is formed to lock onto window 38 when the cap is properly assembled on the body.

When the sensor is mounted on an area adjacent a toilet room device, for example when it is mounted on the sink deck adjacent a faucet, there will be an escutcheon or decorative trim plate which will fit under the sensor assembly and be fixed to the sink deck. In order to insure that the sensor retains its proper alignment and cannot be rotated, the platform 12 has a small boss 56 having a hole 58 which will receive an anti-rotation pin 60. The anti-rotation pin will extend through the trim plate and into the body of the sensor preventing any rotation of the sensor. This insures that the sensor will always be directed in a manner to sense the presence of a user of the toilet room device.

The body 10, and its integral walls and support elements as described may all be made of a suitable plastic. The cap 42 will preferably be formed of metal with a decorative exterior. An epoxy will be used to encapsulate the printed circuit board and the connections between that board and the emitter and detector. The entire assembly is compact, reliable and designed to inhibit or resist any form of vandalism which might alter the reliability of the device in terms of sensing the presence of a user of an adjacent toilet room device. The antirotation pin prevents the sensor assembly from being rotated away from the field of view and the alignment holes in the cap and body insure an unobstructed path for the infrared signals.

Whereas the preferred form of the invention has been shown and described herein, it should be realized that there may be many modifications, substitutions and alterations thereto.

The embodiments of the invention in which an exclusive property or privilege is claimed are defined as follows:

1. A sensor assembly for use in a toilet room for detecting the adjacent presence of the user of a toilet room device, said assembly including a body having a hollow threaded mounting shank extending outwardly therefrom, said body including a platform, an upwardly extending wall on said platform and defining a chamber, an infrared transmitter and an adjacent infrared receiver positioned within said chamber, a mounting board within said chamber, said transmitter and receiver being attached to said mounting board, an electrical cable attached to said mounting board and extending through said threaded shank, a shroud extending about said transmitter and receiver and having a pair of adjacent openings in alignment with said transmitter and receiver, said wall including an infrared transparent window in alignment with the transmitter and receiver openings in said shroud, and a cap extending over said wall, chamber and window and seated upon said platform, said cap having an opening in alignment with said window whereby infrared signals from and to said infrared transmitter and receiver may pass through said cap opening and transparent window for use in detecting the presence of a person adjacent thereto.

2. The sensor assembly of claim 1 characterized by a peripheral support extending upwardly from said platform and outwardly spaced from said wall, a locking opening in said peripheral support, a locking opening in said cap, which locking openings are in alignment when said cap transmitter and receiver opening is in alignment with said window, and a locking pin positioned within said aligned support and cap locking pin openings for attaching said cap to said body.

3. The sensor of claim 2 characterized in that said wall is irregular in shape and is inwardly spaced from said peripheral support.

4. The sensor of claim 2 characterized by an outwardly facing peripheral groove on said peripheral support adjacent said platform, a flexible ring positioned within said groove for centering said cap on said platform.

5. The sensor of claim 1 characterized in that said cap transmitter and receiver opening and window are sized such that said window is fitted within said cap transmitter and receiver opening when said cap is positioned on said platform.

6. The sensor assembly of claim 1 further characterized by and including an antirotation pin extending upwardly from beneath said platform into said body to prevent rotation of said body relative to an underlying support.

\* \* \* \* \*